Aug. 4, 1936.   J. P. PIZARRO   2,050,120
AUTOMATIC PLOW
Filed Jan. 7, 1935   3 Sheets-Sheet 2

Jose P. Pizarro,
INVENTOR
BY Victor J. Evans & Co.
ATTORNEY

WITNESS

Aug. 4, 1936.  J. P. PIZARRO  2,050,120
AUTOMATIC PLOW
Filed Jan. 7, 1935  3 Sheets-Sheet 3

Jose P. Pizarro, INVENTOR

Patented Aug. 4, 1936

2,050,120

UNITED STATES PATENT OFFICE 2,050,120

AUTOMATIC PLOW

José Polanco Pizarro, Central Aguirre, Puerto Rico

Application January 7, 1935, Serial No. 745

4 Claims. (Cl. 97—43)

The invention relates to a plow construction and more especially to motor operated or automatic plows.

The primary object of the invention is the provision of a plow of this character, wherein ground working elements of different characteristics are arranged so that the soil will be plowed and tilled, the implements being mounted so that the same will be raised and lowered by a power medium for varying the penetrating depth thereof in the soil and also certain of these elements are rotatable for breaking lumps of soil and others for digging and scraping purposes so that positive and thorough cutting and breaking of the soil is assured in the operation of the plow.

Another object of the invention is the provision of a plow of this character, wherein the cutting implements are susceptible of tilting action to avoid breaking of the same when striking an obstruction and such elements will return to normal position after tilting through tension action for ground working service.

A further object of the invention is the provision of a plow of this character, wherein the ground working implements are carried on a swinging frame, the same being raised by motive power and said implements are adjusted for vertical movements to regulate the depth of ground action and the operation of the plow being automatic.

A still further object of the invention is the provision of a plow of this character, which is comparatively simple in its construction, thoroughly reliable and efficient in its operation, power operated, readily and easily adjusted, automatically controlled, strong, durable, and comparatively inexpensive to manufacture.

With these and other objects in view, the invention consists in the features of construction, combination and arrangement of parts, as will be hereinafter fully described in detail, illustrated in the accompanying drawings which disclose the preferred embodiment of the invention and pointed out in the claims hereunto appended.

In the accompanying drawings:

Figure 6 is a bottom plan view of the ground working elements.

Similar reference characters indicate corresponding parts throughout the several views in the drawings.

Figure 1:
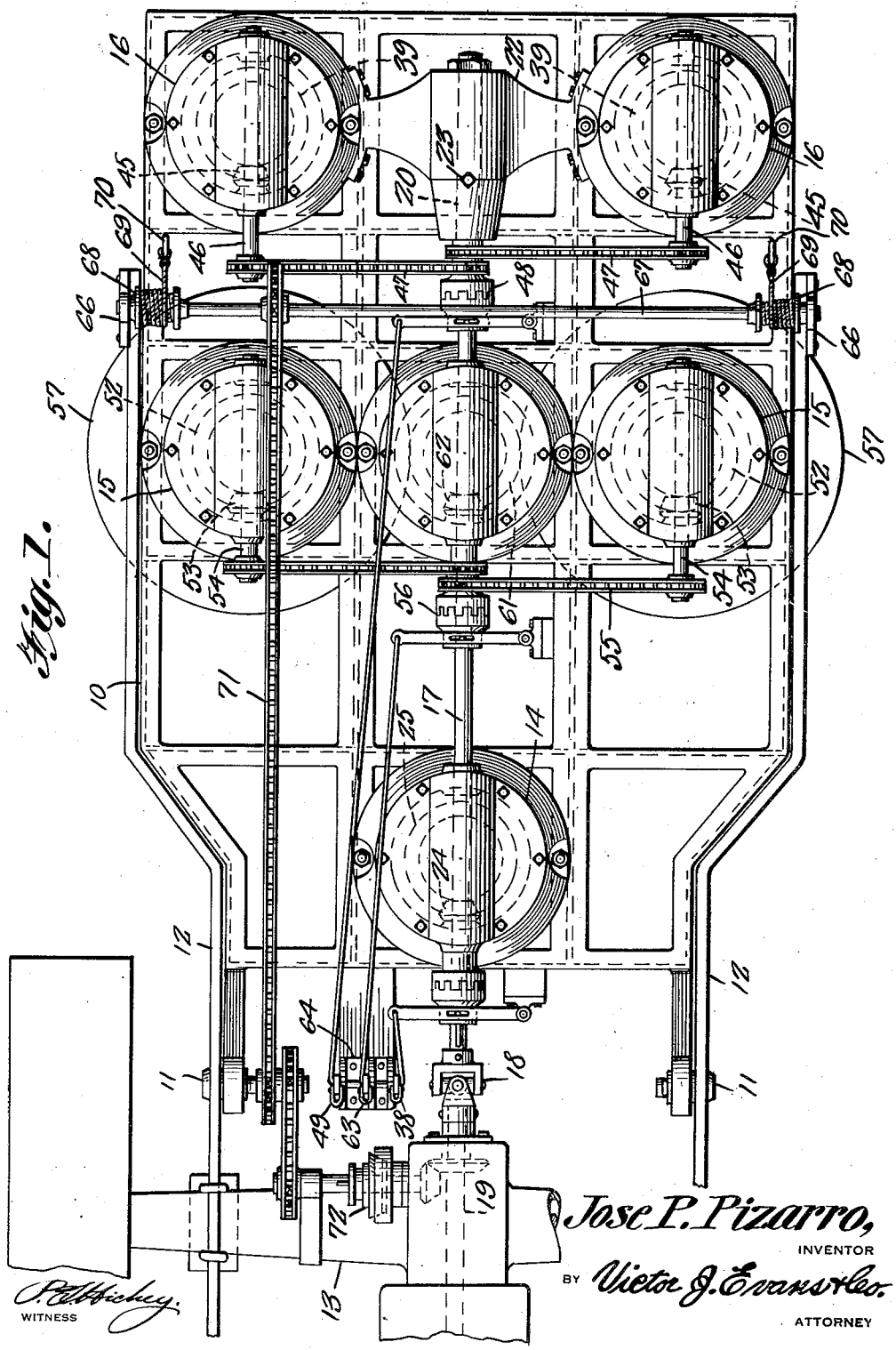
Figure 1 is a top plan view of the plow constructed in accordance with the invention, a portion of a tractor being shown associated therewith.
Figure 2:
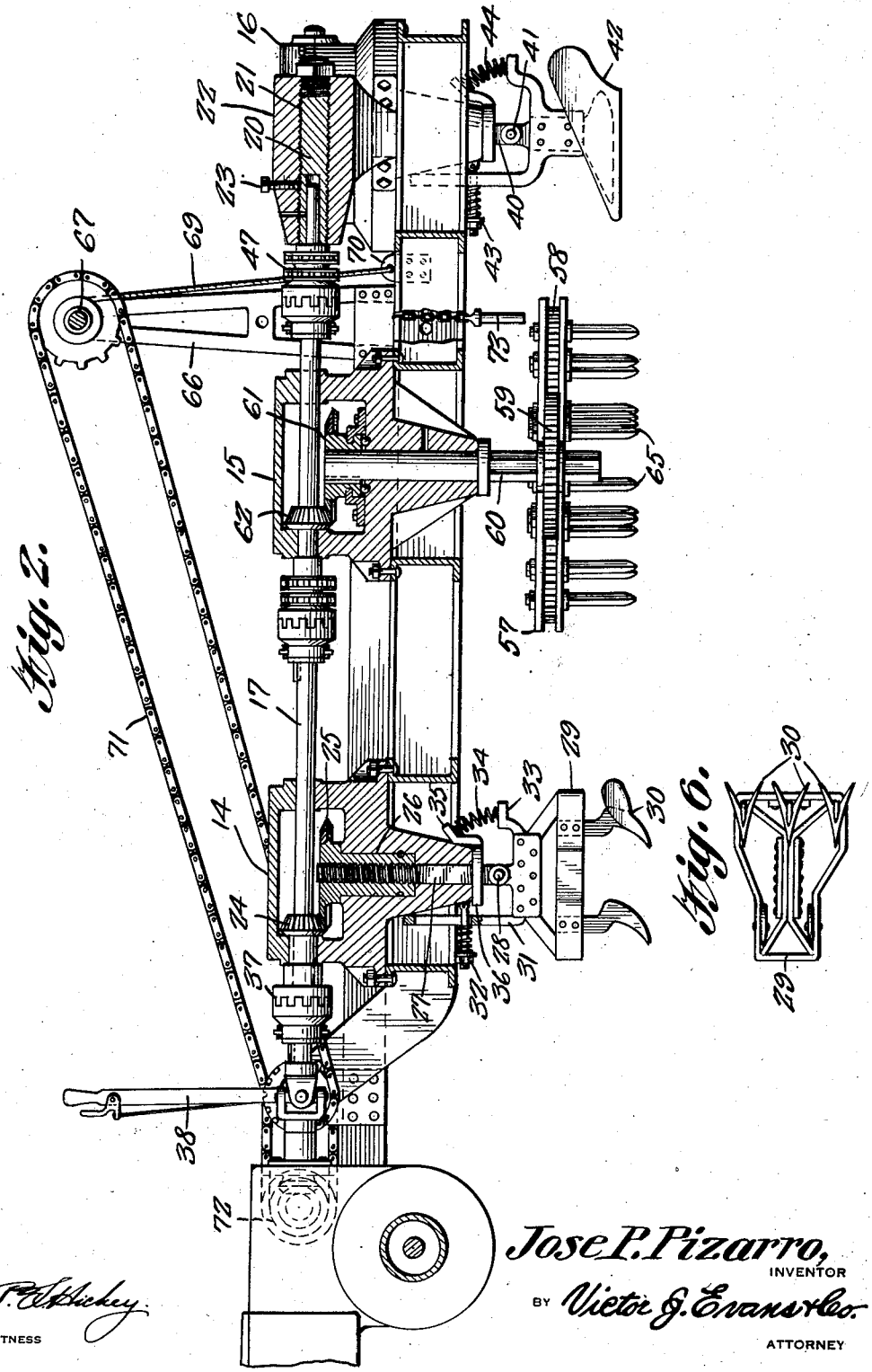
Figure 2 is a vertical longitudinal sectional view of the same.
Figure 3:
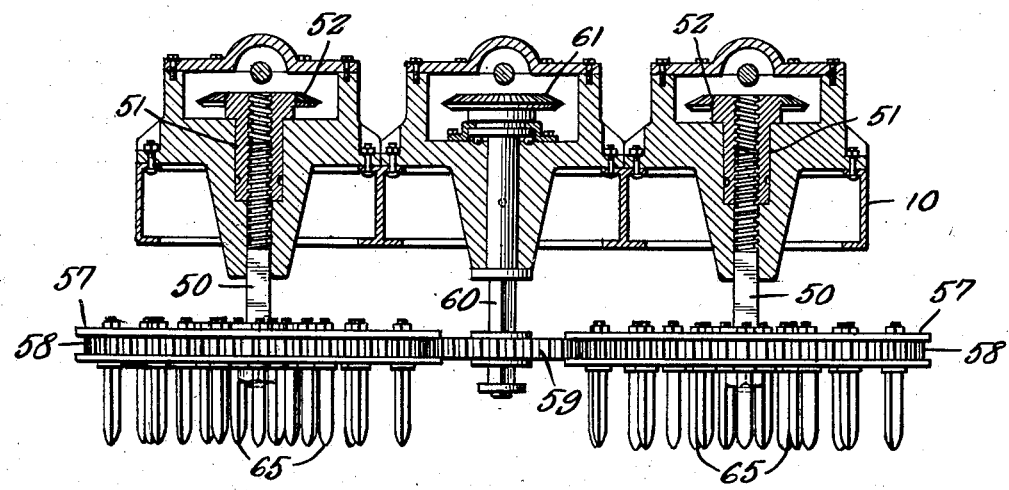
Figure 3 is a vertical transverse sectional view.
Figure 4:
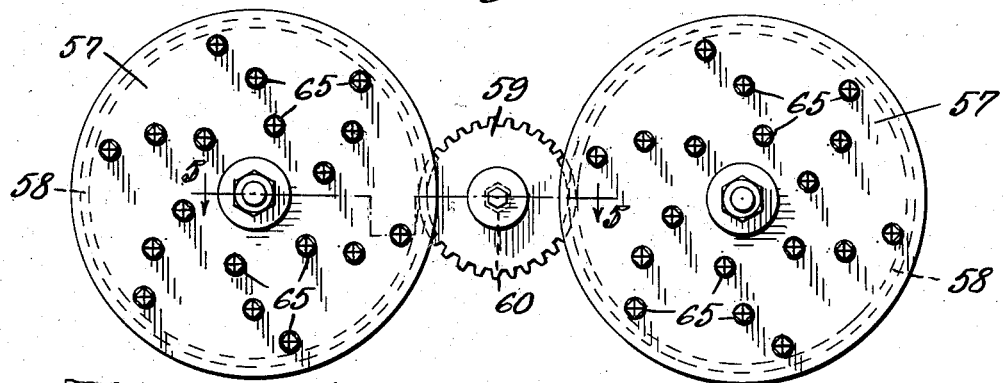
Figure 4 is a bottom plan view of the structure shown in Figure 3.
Figure 5:
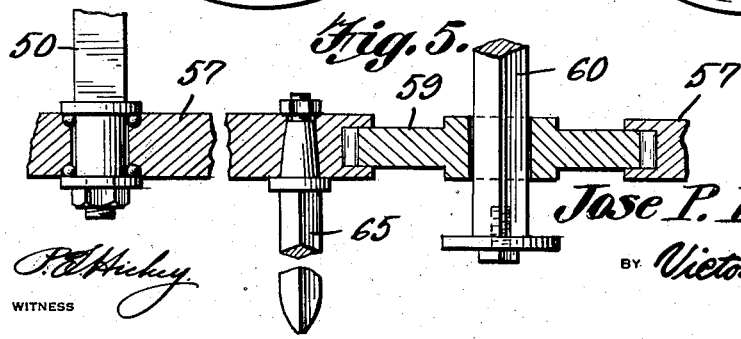
Figure 5 is a fragmentary enlarged vertical sectional view thereof.

Referring to the drawings in detail, the plow constituting the present invention comprises a vertically swinging frame 10 which at its forward end is supported upon pivots 11, these being fixed or carried in the side sills 12 of a motor driven vehicle or tractor, a portion of the same being indicated at 13. The sills 12 are rigid and the frame 10 is adapted to be raised vertically relative thereto.

Arranged fore, aft and intermediate of the frame 10 are series of circular shaped gear boxes 14, 15 and 16, respectively, there being two aft boxes 16, three intermediate boxes 15 and a single fore box 14. The boxes 15 and 16 are located transversely of the frame 10 and the box 14, centrally thereof.

Extended longitudinally and located centrally of the frame 10 is a driving shaft 17 which at its forward end through a universal coupling 18 has connection with the power shaft 19 of the vehicle or tractor 13 while the rear end of this shaft 17 has rotatable and slidable fitting in a bearing 20 adjustably threaded at 21 in a saddle 22 arranged between and made secure to the pair of aft boxes 16. The bearing 20 is held fixed after adjustment by a set screw 23 fitted in the saddle 22. This shaft 17 is passed through the box 14 and the box 15 at the center of the intermediate series of the same, respectively. Loosely rotatable upon the shaft 17 and journaled in the box 14 is a beveled pinion 24 meshing with a companion bevel gear 25 having a hub 26 centrally journaled in the box 14 and threaded upon a stem 27 vertically fitted centrally of the box 14 for raising and lowering movements. This stem 27 has a pivotal connection at 28 with a swinging head or carrier 29 for a gang of ground openers or soil cutters 30. The head or carrier 29 is provided forwardly of the pivot 28 with a slotted upright arm 31 through which passes a spring tensioner 32 pivoted to the lower end of the box 14 while at the other side of the pivot 28 is a heel extension 33 against which acts a coiled tensioning spring 34 having the seat 35 formed on a circular stop 36 on the stem 27. This spring 34 cooperates with the tensioner 32 to maintain the head 29 in a normal horizontal position and placing it under tension when rocked or swung from normal position should the openers or cutters 30 meet an obstruction in the soil so that the openers or cutters may ride over the obstruction and be prevented from breaking by contact therewith. The stop 36 contacts with the box 14 when the stem 27 is raised and limits the elevation or raising movement of the head or carrier 24. The stem is squared in cross section outside of the lay of the threaded connection thereof with the hub 26 and this squared portion fits a corresponding shaped guideway in the box 14 so that the stem is prevented from rotation in the box, the hub 26 of the gear 25 being rotatably journaled in said box. The screw connection of the hub 26 with the stem 27 permits the raising and lowering of the latter for regulating the relation of the openers or cutters 30 with respect to the soil or ground.

The gear 24 is controlled by a clutch 37 so that it may be locked with or unlocked from the shaft 17 and this clutch 37 is manually actuated from a latch release hand throw lever 38. In this manner a direct hand control for raising and lowering action of the openers or cutters 30 is had.

In each of the pair of aft boxes 16 is arranged a bevel gear 39 which is similar to the gear 25 and is in threaded connection with a stem 40 corresponding to the stem 27 and by a pivot 41 swingingly carries a ground or soil cutting implement or element 42, which is in the form of a plow tensioned against rocking movement by the devices 43 and 44, respectively, these corresponding to the parts 32 and 34 hereinbefore described. The gear 39 meshes with a pinion 45. The pinions 45 are fixed to driven shafts 46 these being journaled in the boxes 16 and through sprocket and chain connections 47 and an associated clutch 48 therewith and the shaft 17 will be driven from the latter. On the driving of the shafts 46 the ground working elements 42 each will be adjusted vertically relative to the ground or soil. The clutch 48 is manually actuated from a latch release hand lever 49.

Mounted for vertical slidable adjustment in the outer boxes 15 of the intermediate series are raising and lowering stems 50 having internal threaded engagement with the hubs 51 of bevel gears 52 meshing with pinions 53 on driven shafts 54, these through sprocket and chain connections 55 in association with a clutch 56 therewith and the shaft 17 will be driven by the latter. These stems 50 at their lower ends support rotatable disks 57, these being formed with inset peripheral gear teeth 58 meshing with a gear 59 located between the disks 57. This gear 59 is slidably fitted with and rotatable by a stem 60 journaled centrally in the box 15 centrally located of the intermediate series. The stem has fitted therewith the gear 61 meshing with a pinion 62. Thus it will be apparent that the stem 60 will be rotated from the shaft 17 and simultaneously the stems 50 may be adjusted vertically for regulating the relation of the disks 57 with respect to the ground or soil. The clutch 56 is manually controlled through a latch release hand throw lever 63 and regulates the driving of the chain and sprocket connections 55. These hand levers 38, 49 and 63 are preferably located together on a suitable stand or mount 64 upon the frame 10. The disks 57 and the gear 59 in their meshing engagement are interlocked for simultaneous vertical movement with each other.

The disks 57 carry ground working spikes or teeth 65 arranged spaced from each other and radially disposed along curvilinear paths outwardly of the disks and function to break up lumps and are harrow-acting upon the ground or soil in the use of the plow.

At the rearmost ends of the side sills 12 are uprights 66 having a journal therein the axle 67 for windlasses or winches 68 carrying hoist cables 69 to be wound on and unwound therefrom and attached by ears 70 at the rear portion of the frame 10. When the cables 69 are wound upon the windlasses or winches 68 the frame 10 will swing vertically on the pivots 11 for the rear end raising of this frame. The power shaft 19 through the clutch control supplemental or auxiliary driving connections 71 with the axle 67 drives the latter by the working of the windlasses or the winches, the clutch for the connections 71 being indicated at 72 and is manually controlled.

It will be understood that in the use of the plowing machine constructed as heretofore stated the openers or cutters 30 will be vertically adjusted by mechanical power, this being true with respect to the plows 42 and the disks 57 for the proper ground working action in the draft of the machine by the vehicle or tractor 13. The disks 57 are driven for rotation by the shaft 17 which is connected with the power shaft 19 of the said vehicle or tractor and the spikes or teeth 65 of these disks will break lumps of soil and give a scraping action on the latter. The openers or cutters 30 and the plows 42 in their advancement will be free for tripping action when meeting obstructions so as to become freed therefrom without being damaged thereby. The frame 10 can be readily lifted on the operation of the windlasses or winches for the winding of the hoisting cables 69 thereon and thus rendering the machine inactive so that it may be transported from one locality to another under draft of the vehicle or tractor 13. The plowing machine is suitable for cane agriculture and is serviceable for soil tilling in agricultural activities.

Carried by the uprights 66 and engageable with the frame 10 and opposite sides thereof are latching pins 73 which serve to hold the frame 10 in an elevated position.

What is claimed is:

1. A machine of the kind described comprising a frame, gear boxes arranged fore and aft of said frame, beveled gears journaled in the boxes, stems vertically adjustable in certain of said boxes on the turning of said gears, ground working implements on said stems, means tensioning certain of the ground working elements for permitting automatic tripping thereof, a power shaft having connection with certain of the ground working elements for imparting motion thereto and operating through the remainder of said gear boxes, and clutch controlled means between the power shaft and the beveled gears for operating the latter.

2. A machine of the kind described comprising a frame, gear boxes arranged fore and aft of said frame, beveled gears journaled in the boxes, stems vertically adjustable in certain of said boxes on the turning of said gears, ground working implements on said stems, means tensioning certain of the ground working elements for permitting automatic tripping thereof, a power shaft having connection with certain of the ground working elements for imparting motion thereto and operating through the remainder of said gear boxes, clutch controlled means between the power shaft and the beveled gears for operating the latter, and a motor vehicle having supports for said frame.

3. A machine of the kind described comprising a frame, gear boxes arranged fore and aft of said frame, beveled gears journaled in the boxes, stems vertically adjustable in certain of said boxes on the turning of said gears, ground working implements on said stems, means tensioning certain of the ground working eelements for permitting automatic tripping thereof, a power shaft having connection with certain of the ground working elements for imparting motion thereto and operating through the remainder of said gear boxes, clutch controlled means between the power shaft and the beveled gears for operating the latter, a motor vehicle having supports for said frame, and pivots mounting the frame in said supports for vertical swinging movement of said frame.

4. A machine of the kind described comprising a frame, gear boxes arranged fore and aft of said frame, beveled gears journaled in the boxes, stems vertically adjustable in certain of said boxes on the turning of said gears, ground working implements on said stems, means tensioning certain of the ground working elements for permitting automatic tripping thereof, a power shaft having connection with certain of the ground working elements for imparting motion thereto and operating through the remainder of said gear boxes, clutch controlled means between the power shaft and the beveled gears for operating the latter, a motor vehicle having supports for said frame, pivots mounting the frame in said supports for vertical swinging movement of said frame, and means operated by the vehicle for raising and lowering said frame.

JOSE POLANCO PIZARRO.